United States Patent
Peczalski et al.

(10) Patent No.: US 10,181,768 B2
(45) Date of Patent: Jan. 15, 2019

(54) ENERGY HARVESTER AND ROTATING SHAFT VIBRATION SENSOR

(71) Applicant: HONEYWELL INTERNATIONAL INC., Morristown, NJ (US)

(72) Inventors: Andy Peczalski, Edina, MN (US); Todd Hanson, Loretto, MN (US)

(73) Assignee: Honeywell International Inc., Morris Plains, NJ (US)

(*) Notice: Subject to any disclaimer, the term of this patent is extended or adjusted under 35 U.S.C. 154(b) by 671 days.

(21) Appl. No.: 13/895,969

(22) Filed: May 16, 2013

(65) Prior Publication Data
US 2014/0339943 A1 Nov. 20, 2014

(51) Int. Cl.
*H02K 47/00* (2006.01)
*H02K 7/18* (2006.01)
*H02K 15/02* (2006.01)
*H02K 21/14* (2006.01)

(52) U.S. Cl.
CPC ......... *H02K 7/1807* (2013.01); *H02K 15/024* (2013.01); *H02K 21/14* (2013.01)

(58) Field of Classification Search
CPC .......... H02K 7/18; H02K 51/00; H02K 16/00; H02K 16/02; H02K 7/1807; H02K 15/024; H02K 21/14
USPC ............ 310/112–113, 156.35, 181, 216.023, 310/12.15, 140–149, 151–153, 88–90, 310/254.1, 156.36; 318/650, 145, 400.32, 318/400.33, 400.3
See application file for complete search history.

(56) References Cited

U.S. PATENT DOCUMENTS

| | | | | |
|---|---|---|---|---|
| 3,492,520 A | * | 1/1970 | Yates | H02K 1/276 310/156.79 |
| 4,358,695 A | * | 11/1982 | MacDonald | H02K 49/043 310/105 |
| 4,793,186 A | * | 12/1988 | Hurley | G01H 1/10 73/650 |
| 5,650,680 A | * | 7/1997 | Chula | H02K 1/276 310/111 |
| 5,710,474 A | * | 1/1998 | Mulgrave | H02K 1/12 310/156.25 |
| 5,808,450 A | * | 9/1998 | Chula | H02K 3/04 315/160 |

(Continued)

*Primary Examiner* — Thanh Lam
(74) *Attorney, Agent, or Firm* — Craige Thompson; Thompson Patent Law

(57) ABSTRACT

An energy harvester for harvesting energy from a rotating machine having a rotatable machine shaft includes a non-magnetic housing, a harvester shaft, a rotor, and a plurality of electrically isolated stators. The housing is adapted to couple to the rotating machine. The harvester shaft is disposed within the housing and is adapted to couple to and rotate with the machine shaft or in some cases becomes the rotating shaft of the machine. The rotor is disposed within the housing and is coupled to and surrounds at least a portion of the harvester shaft. The rotor comprises an N-pole permanent magnet. The plurality of stators are disposed within and coupled to the housing. Each stator surrounds the rotor and is spaced apart therefrom by an air gap. Each stator also has a set of windings wound thereon. Different numbers of stators could be operating together, whereas other stators are disconnected to extend the rotational speed range.

20 Claims, 5 Drawing Sheets

(56) References Cited

U.S. PATENT DOCUMENTS

| | | | | |
|---|---|---|---|---|
| 6,265,804 B1* | 7/2001 | Nitta | ............... | H02K 1/148 |
| | | | | 310/193 |
| 6,700,252 B2* | 3/2004 | Fleshman | ............... | H02K 5/132 |
| | | | | 310/254.1 |
| 6,940,245 B2 | 9/2005 | Scarlet et al. | | |
| 7,309,938 B1* | 12/2007 | Smith | ............... | H02K 7/1807 |
| | | | | 310/112 |
| 7,952,252 B2* | 5/2011 | Kang | ............... | H02K 21/145 |
| | | | | 310/216.015 |
| 8,011,255 B2 | 9/2011 | Arms et al. | | |
| 2002/0023496 A1 | 2/2002 | Ono et al. | | |
| 2002/0047448 A1* | 4/2002 | Kawamura | ............... | B60K 6/26 |
| | | | | 310/181 |
| 2005/0017602 A1* | 1/2005 | Arms | ............... | B60C 23/0411 |
| | | | | 310/339 |
| 2010/0090553 A1* | 4/2010 | Ritchey | ............... | H02K 16/00 |
| | | | | 310/114 |
| 2010/0289271 A1 | 11/2010 | DiMauro et al. | | |
| 2011/0227438 A1* | 9/2011 | Hassnain | ............... | H02K 53/00 |
| | | | | 310/113 |
| 2012/0107094 A1* | 5/2012 | Lillis | ............... | F01D 17/06 |
| | | | | 415/118 |
| 2012/0205986 A1* | 8/2012 | Frampton | ............... | H02J 3/381 |
| | | | | 307/84 |

* cited by examiner

ENERGY HARVESTER AND ROTATING SHAFT VIBRATION SENSOR

TECHNICAL FIELD

The present invention generally relates to energy harvesting, and more particularly relates to an energy harvester and rotating shaft vibration sensor.

BACKGROUND

Rotating machines are used in myriad systems and environments. In many instances the rotating machine may be used in a part of a system that relies on sensors. For example, vibration sensors may be used to monitor the health of one or more bearings, or proximity sensors may serve process control or other functions. No matter the number or types of sensors, these sensors may typically require electrical power for proper operation and communication. However, providing wiring to supply electrical power from a remote electrical power source to the sensors may be relatively expensive.

Therefore, it would be desirable to harvest energy relatively easily and relatively inexpensively harvest electrical energy from rotating machines, and do so in a manner that is relatively easy and relatively inexpensive. The present invention addresses at least this need.

BRIEF SUMMARY

In one embodiment, an energy harvester for harvesting energy from a rotating machine having a rotatable machine shaft includes a non-magnetic housing, a harvester shaft, a rotor, and a plurality of electrically isolated stators. The housing is adapted to couple to the rotating machine. The harvester shaft is disposed within the housing and is adapted to couple to and rotate with the machine shaft. The rotor is disposed within the housing and is coupled to and surrounds at least a portion of the harvester shaft. The rotor comprises an N-pole permanent magnet. The stators are disposed within and coupled to the housing. Each stator surrounds the rotor and is spaced apart therefrom by an air gap. Each stator also has a set of windings wound thereon.

In another embodiment, a machine includes a motor and an energy harvester. The motor includes a motor shaft and is configured, upon being energized, to generate a torque that causes the motor shaft to rotate. The energy harvester is coupled to the motor shaft and includes a non-magnetic housing, a harvester shaft, a rotor, and a plurality of electrically isolated stators. The housing is adapted to couple to the rotating machine. The harvester shaft is disposed within the housing and is coupled to the motor shaft. The rotor is disposed within the housing and is coupled to and surrounds at least a portion of the harvester shaft. The rotor includes an N-pole permanent magnet. The stators are disposed within and coupled to the housing. Each stator surrounds the rotor and is spaced apart therefrom by an air gap. Each stator also has a set of windings wound thereon.

Furthermore, other desirable features and characteristics of the energy harvester will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
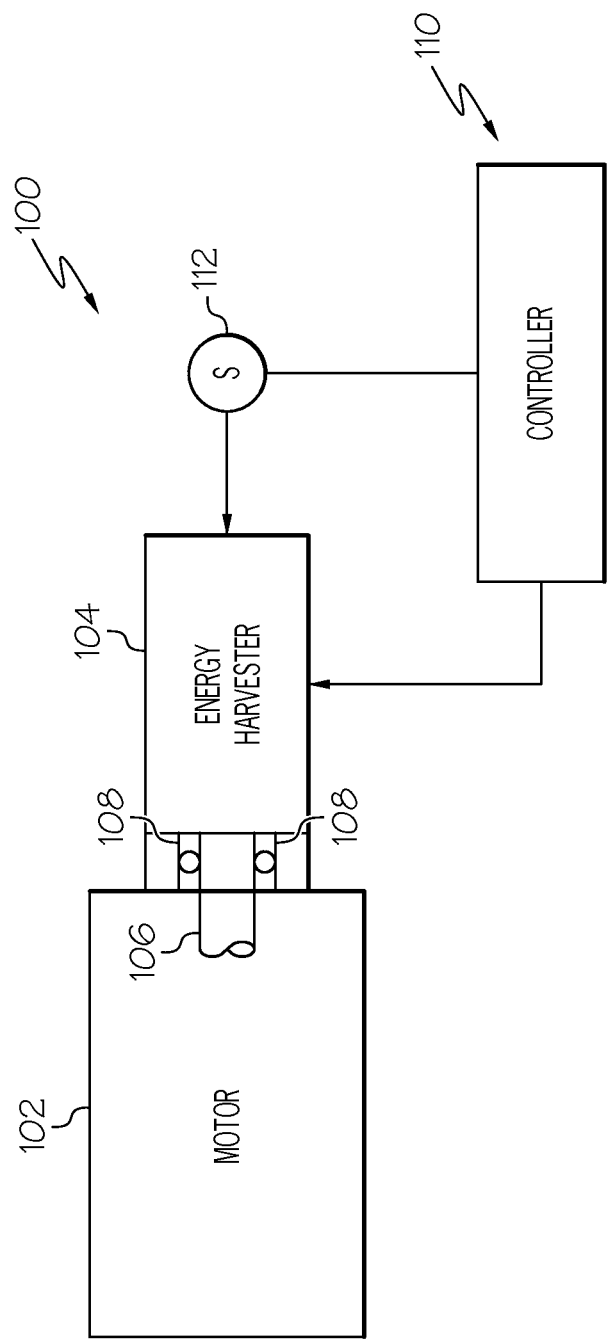
FIG. 1 depicts a functional block diagram of an embodiment of a machine.

Referring first to FIG. 1, a functional block diagram of an embodiment of a machine 100 is depicted and includes a rotating machine 102, such as a motor, and an energy harvester 104. The motor 102 may be implemented and configured as any one of numerous types of electric, hydraulic, or pneumatic motors. No matter its specific implementation and configuration, the rotating machine 102 is coupled to, or at least includes, a machine shaft 106 that is rotationally mounted via one or more bearings 108. The rotating machine 102 is additionally configured, upon being electrically, hydraulically, or pneumatically energized, to generate a torque that causes the shaft 106 to rotate. It will be appreciated that the shaft 106 could be used to drive any one of numerous types of components, such as a conveyer belt, just to name one example.

Figure 2:
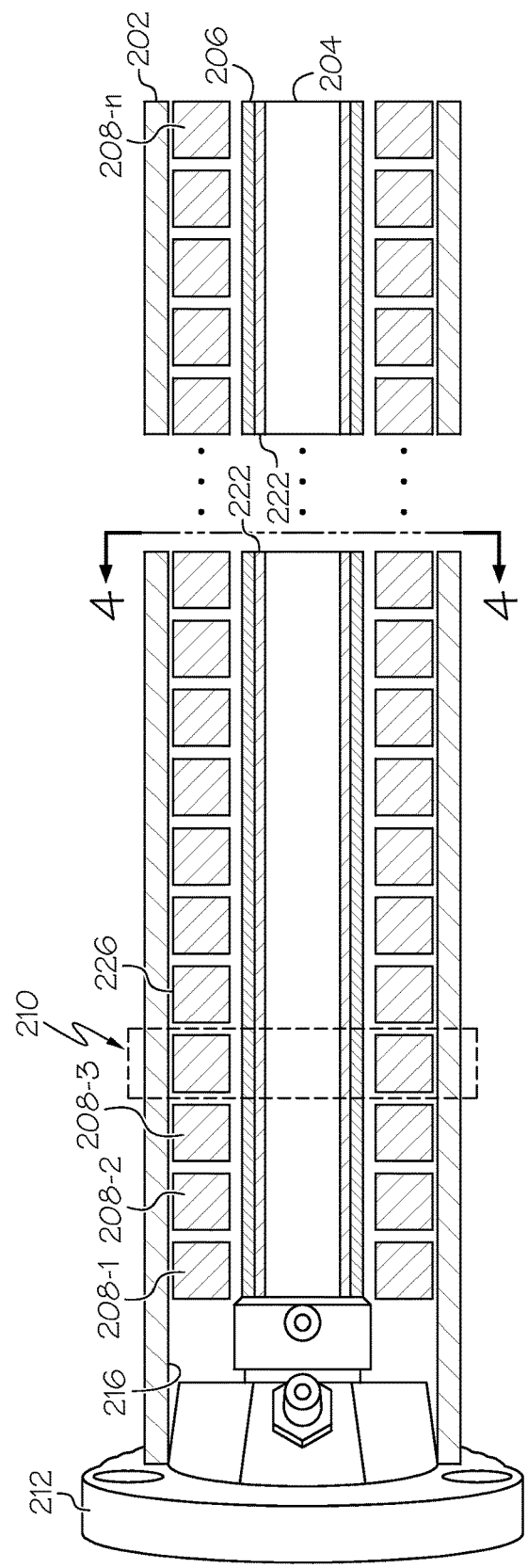
FIGS. 2 and 3 depict two simplified representations of one particular embodiment of an energy harvester that may be used to implement the machine of FIG. 1.

The energy harvester 104 is coupled to the machine shaft 106 via the bearings 108 and is configured as an electrical generator. Thus, the energy harvester generates electrical power upon rotation of the machine shaft 106. The energy harvester 104, like the rotating machine 102, may be variously implemented and configured. Simplified representations of one particular embodiments of the energy harvester 104 are depicted in FIGS. 2 and 3, and with reference thereto will now be described.

The depicted energy harvester 104 includes a housing 202, a harvester shaft 204, a rotor 206, and a plurality of stators 208 (e.g., 208-1, 208-2, 208-3 . . . 208-n). The housing is preferably made of a relatively stiff, non-magnetic material, such as aluminum, and is coupled to the rotating machine 102. Although the housing 202 may be coupled to any one of numerous portions of the rotating machine 102, in the depicted embodiment it is coupled to a bearing housing assembly 212, which houses the bearings 108.

Figure 3:
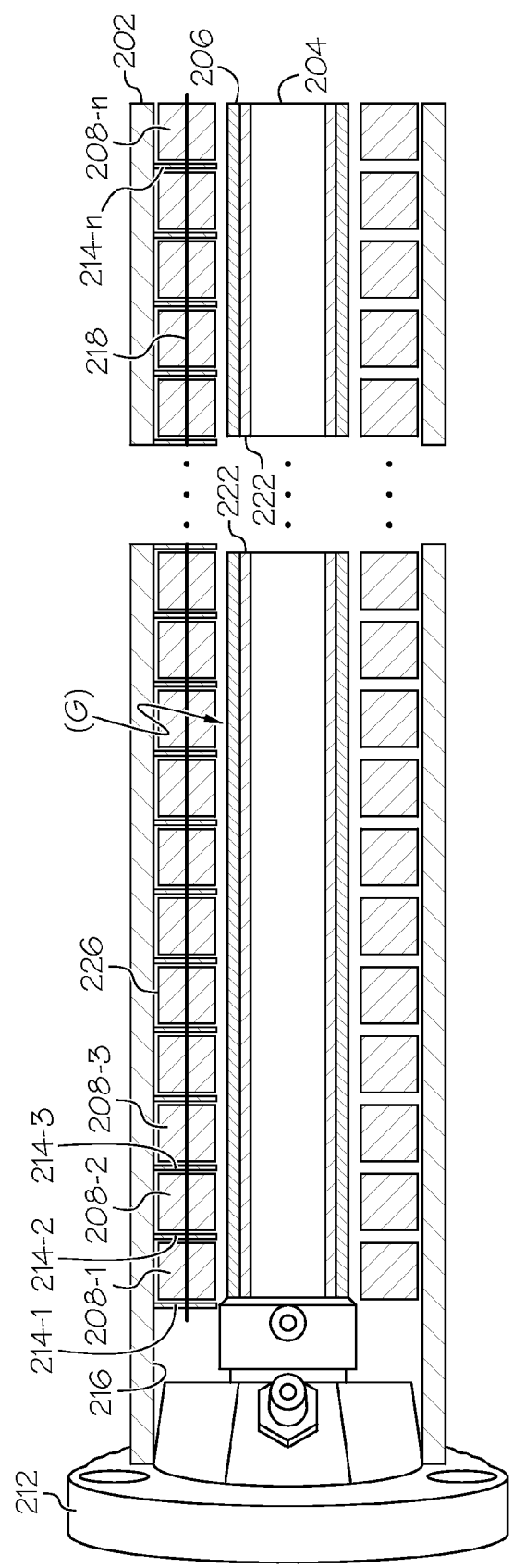

In some embodiments, as depicted more clearly in FIG. 3, the housing 202 may additionally include a plurality of non-magnetic spacers 214 (e.g., 214-1, 214-2, 214-3 . . . 214-n). The spacers 214 extend radially inwardly from the inner surface 216 of the housing 202 and may be formed integrally with the housing 202 or formed separately therefrom and subsequently coupled thereto. In either case, each spacer 214 is disposed adjacent at least one of the stators 208, but in most cases, with the exception of the spacer 214-1 closest to the rotating machine 102, each spacer 214 is disposed between two of the stators 208. To provide structural stability and a relatively simple means of assembly, one or more fasteners 218 (only one depicted) may extend through each of the stators 208 and each of the spacers 214 to secure the stators 208 within the housing 202.

The harvester shaft 204 is disposed within the housing 202 and is coupled to, and thus rotates with, the machine shaft 106. More specifically, the harvester shaft 204 preferably extends into the bearing housing assembly 212, and is rotationally mounted via the bearings 108. Thus, the energy harvester 104 preferably includes no bearings of its own. Rather, it shares the bearings 108 within the rotating machine 102. In some embodiments, the harvester shaft 204 and machine shaft 106 may be integrally formed. Moreover, the harvester shaft 204 rotates about the same rotational axis as the machine shaft 106, and at the same rotational speed as the machine shaft 106. The harvester shaft 204 may be made of any one of numerous materials, which may be either magnetic or non-magnetic. If the harvester shaft 204 is made of a non-magnetic material, then the energy harvester 104 will additionally include a magnetic flux return 222. The magnetic flux return 222, when included, is disposed between the harvester shaft 204 and the rotor 206. In the depicted embodiment, the magnetic flux return 222 is mounted on, and coupled directly to, the harvester shaft 204.

Figure 4:
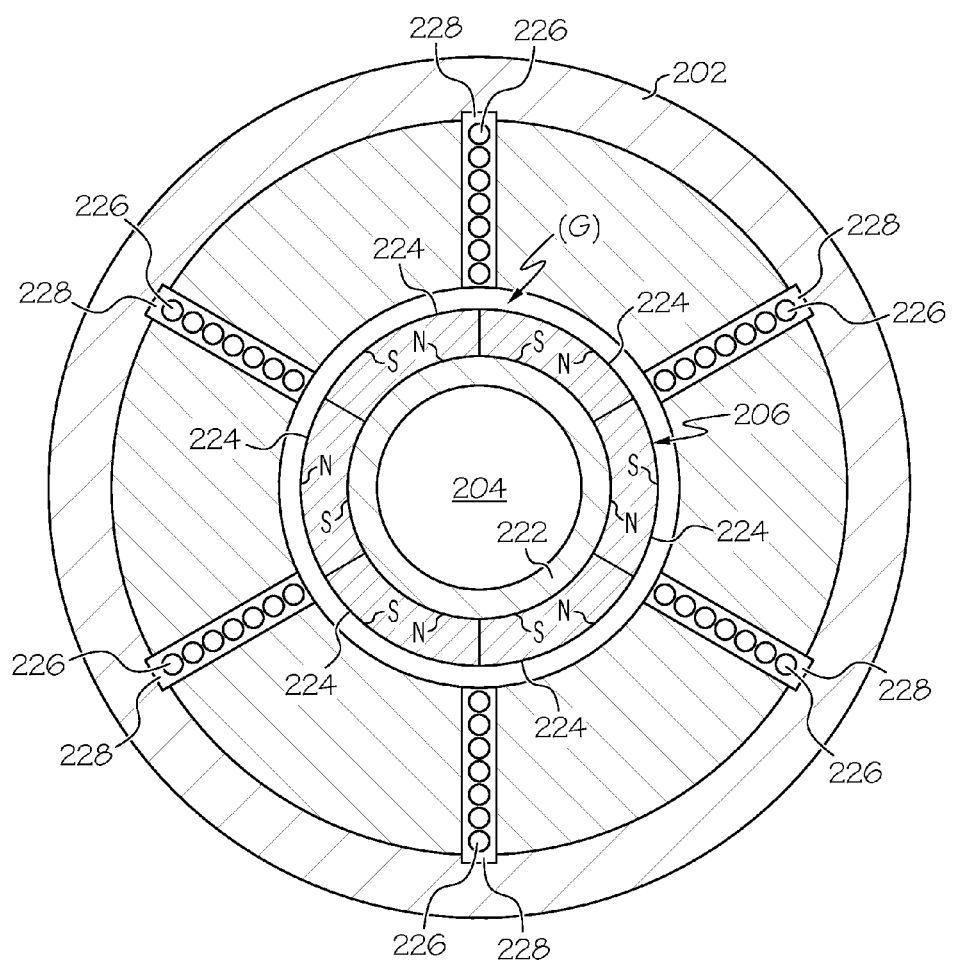
FIG. 4 depicts a cross section of the energy harvester taken along line 4-4 in FIG. 2.

The rotor 206 is disposed within the housing 202 and is coupled to and surrounds at least a portion of the harvester shaft 204. The rotor 206 thus rotates with the harvester shaft 204. It will be appreciated that the rotor 206 may be variously implemented and configured, but in the depicted embodiment, the rotor 206 comprises a multi-pole (i.e., N-pole) permanent magnet. As may be appreciated, the N-pole permanent magnet may be variously configured and implemented. Preferably, however, and as FIG. 4 depicts, the N-pole permanent magnet comprises N-number of radially magnetized permanent magnet segments 224. Each permanent magnet segment 224 is coupled between two other permanent magnet segments 224, and each permanent magnet segment 224 has its poles disposed opposite to those of the two other permanent magnet segments 224 between which it is disposed. It will be appreciated that the number (N) of permanent magnet segments 224, and thus the number of poles that the N-pole permanent magnet comprises may vary. Preferably, however, the number (N) is an even integer that is greater than two. In the exemplary embodiment depicted in FIG. 4, N=6. It will additionally be appreciated that the N-pole permanent magnet may be implemented as a single-piece device, such as the one depicted in FIGS. 2 and 3, or it may be implemented using a plurality of N-pole permanent magnets.

Each of the stators 208 is disposed within and is coupled to the housing 202. The stators 208 are electrically isolated from each other, and each surrounds the rotor 206 and spaced apart therefrom by an air gap (G). The size of the air gap (G) may vary, but in the depicted embodiments the air gap (G) is at least 2.0 millimeters (mm), which allows for the presence of dust and debris in the air gap, and for some misalignment of the rotor and stator. Each stator 208 has a set of windings 226 wound thereon. The windings 226 on each stator 208 are electrically isolated from the windings 226 on all of the other stators 208. Thus, as FIG. 2 depicts using dotted lines, each stator 208, its associated windings 226, together with the rotor 206, form a single "generator module" 210. It will be appreciated that the number (n) of stators 208 may vary, and may be selected to meet desired performance requirements. As will be described further below, electrical energy may be drawn from 1, 2, 3, up to all n-number of stators 208. The number of stators 208 (e.g., generator modules 210) from which electrical energy is drawn may be controlled in order to attain a desired level of efficiency and/or output voltage.

Figure 5:
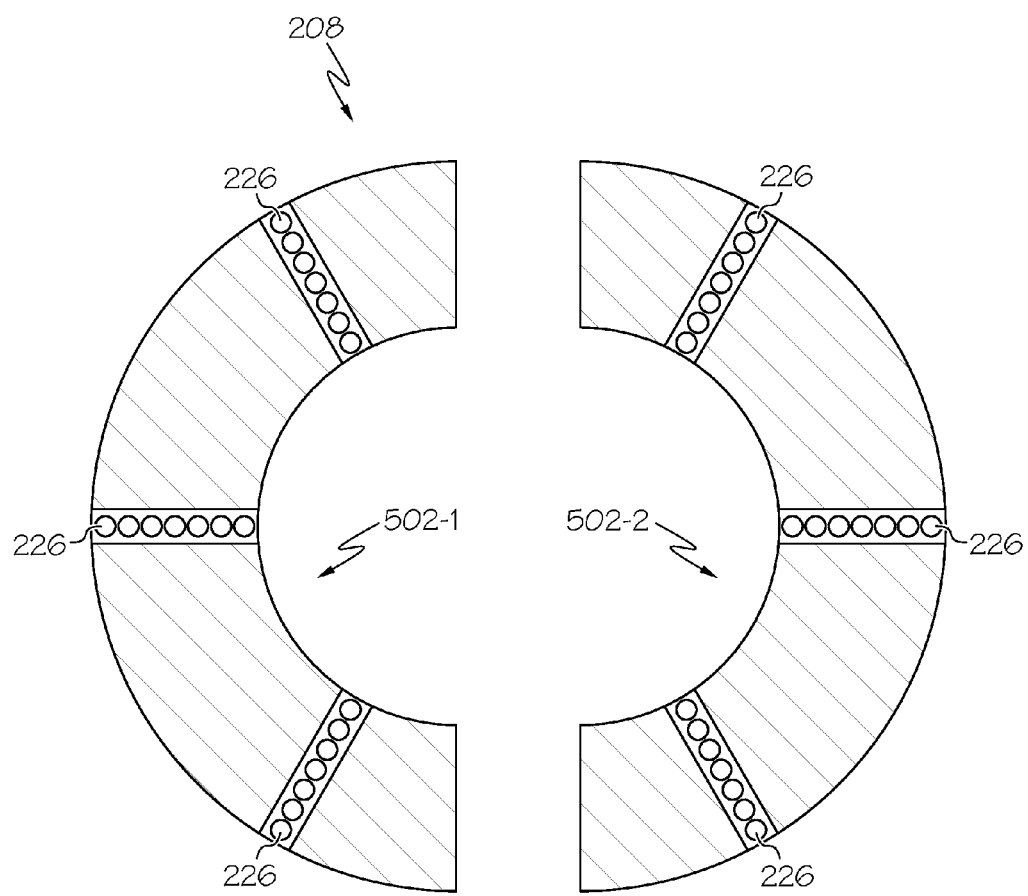
FIG. 5 depicts a simplified representation of one embodiment of a stator that may be used to implement the energy harvester of FIGS. 2-4.

Referring once again to FIG. 4, it may be seen that each stator 208 includes a plurality of gaps, openings, or grooves 228 within which the windings 226 are wound and disposed. In a particular preferred embodiment, the gaps, openings, or grooves 228 are filled with a magnetic materially, such as iron, after the windings 226 are wound on each of the individual stators 208. The stators 208 may be variously manufactured, but in one embodiment, which is shown more clearly in FIG. 5, the stators 208 each comprise two stator halves 502-1, 502-2. After the windings 226 are wound on each of the halves 502-1, 502-2 using a low-cost, automated winding technique, the two halves 502-1, 502-2 are squeezed together to form a single stator 208. Preferably, the faces of the two stator halves 502-1, 502-2 that come together during assembly are well polished so there is a minimal air gap between them.

As previously noted, the number of generator modules 210 from which electrical energy is drawn may be controlled. To do so, and with reference once again to FIG. 1, a controller 110 is additionally coupled to energy harvester 104. The controller 110 is configured to selectively draw electrical energy from one or more of the generator modules 210. In particular, the system 100 may additionally include one or more voltage sensors 112 (only one shown). The voltage sensor 112, when included, senses the output voltage of the energy harvester 104 and supply a sensor signal representative thereof to the controller 110. The controller 110, in response to the sensor signal, will selectively draw electrical energy from one or more of the stators 208 (e.g., from one or more of the generator modules 210) to achieve, for example, a desired output voltage. The remaining stators 208 will remain disconnected. This selective drawing of electrical energy from one or more of generator modules 210 allows the energy harvester 104 to operate over a wide range of machine shaft rotational speeds (e.g., 10-1000 rpm) without exceeding the allowed voltage and power level of the controller electronics. Without this capability, the energy harvester 104 could only operate in a relatively narrow frequency range (e.g., 100-1000 Hz).

With the above-described configuration, the energy harvester 104 depicted in FIGS. 2 and 3, a single one of the generator modules 210 may generate 267 volts (V) and 3.18 watts (W) of electrical power at 1000 revolutions per minute (rpm), 10 generator modules may generate 267 V and 3.18 W at 100 rpm, 20 generator modules may generate 107 V and 1.08 W at 20 rpm, 20 generator modules may generate 53.4 V and 0.44 W at 10 rpm, and 20 generator modules may generate 16 V and 0.04 W at 3 rpm.

As may be appreciated, any movement of the machine shaft 106 perpendicular to the axis of rotation will modulate the electrical waveform output by the energy harvester 104. This is because such movement will cause the rotor 206 to move selectively closer to and farther away from the stators 208. When the rotor 206 is closer to a stator 208, greater voltage is generated, and vice-versa. The effects of any misalignment of the rotor 206 and stators 208 during installation could be calibrated out by measuring the modulation at a relatively low rotational rate, e.g. about 1 rpm, when wobble and vibration are negligible. Thus, the vibration and wobble of the shaft 106 can be simultaneously monitored during energy harvesting. In this regard, and with reference back to FIG. 1, controller 110 may additionally be configured to sense vibration and wobble of the machine shaft 106.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An energy harvester for harvesting energy from a rotating machine having a rotatable machine shaft, the energy harvester comprising:
   a non-magnetic housing adapted to couple to the rotating machine;
   a harvester shaft disposed within the non-magnetic housing and adapted to couple to and rotate with the machine shaft;
   a rotor disposed within the non-magnetic housing and coupled to and surrounding at least a portion of the harvester shaft, the rotor comprising an N-pole permanent magnet;
   a plurality of electrically isolated stators disposed within and coupled to the non-magnetic housing, each stator surrounding the rotor and spaced apart therefrom by an air gap, each stator having a set of windings wound thereon,
   wherein, the set of windings wound on each stator are electrically isolated from the set of windings wound on all of the other stators, whereby each stator and its associated set of windings, together with the rotor, form a single generator module,
   wherein a plurality of generator modules are formed from the plurality of stators, each associated set of windings on each stator, and the rotor; and
   a controller coupled to each generator module of the plurality of generator modules, wherein the controller is configured to: selectively draw electrical energy from one or more of the generator modules, the number of generator modules electrically connected is selected based on an output voltage of the energy harvester, in order to maintain the output voltage over a range of harvester shaft rotational speeds based on the selective drawing of electrical energy from the one or more of the generator modules.

2. The energy harvester of claim 1, wherein the N-pole permanent magnet is radially magnetized;
   wherein each stator comprises a first stator half and a second stator half, wherein faces of the two stator halves that come together during assembly are polished so there is a minimal air gap between them.

3. The energy harvester of claim 1, wherein:
   the N-pole permanent magnet comprises N-number of radially magnetized permanent magnet segments;
   each permanent magnet segment coupled between two other permanent magnet segments; and
   each permanent magnet segment has its poles disposed opposite to those of the two other permanent magnet segments between which it is disposed.

4. The energy harvester of claim 1, wherein:
   the harvester shaft is non-magnetic; and
   the energy harvester further comprises a magnetic flux return disposed between the rotor and the harvester shaft.

5. The energy harvester of claim 1, wherein the non-magnetic housing includes an inner surface and comprises a plurality of non-magnetic spacers, each spacer extending radially inwardly from the inner surface and disposed between two of the stators.

6. The energy harvester of claim 5, further comprising a fastener extending through each of the stators and each of the spacers and securing the stators within the non-magnetic housing.

7. The energy harvester of claim 1, wherein the controller is further configured to selectively draw electrical energy from a predetermined number of the plurality of generator modules when harvester shaft rotational speed exceeds a predetermined value.

8. The energy harvester of claim 1, wherein each stator comprises a plurality of grooves within which the set of windings are wound and disposed, wherein each groove is filled with iron.

9. A machine, comprising:
   a motor comprising a motor shaft and configured, upon being energized, to generate a torque that causes the motor shaft to rotate; and
   an energy harvester coupled to the motor shaft, the energy harvester comprising:
   a non-magnetic housing adapted to couple to a rotating machine;
   a harvester shaft disposed within the non-magnetic housing and coupled to the motor shaft, the harvester shaft extending into a bearing housing assembly, wherein the bearing housing assembly is coupled to the non-magnetic housing, wherein the harvester shaft is rotationally mounted to bearings of the motor, wherein the bearings are positioned within the bearing housing assembly;
   a rotor disposed within the non-magnetic housing and coupled to and surrounding at least a portion of the harvester shaft, the rotor comprising an N-pole permanent magnet; and a plurality of electrically isolated stators disposed within and coupled to the non-magnetic housing, each stator surrounding the rotor and spaced apart therefrom by an air gap, each stator having a set of windings wound thereon, wherein the set of windings wound on each stator are electrically isolated from the set of windings wound on all of the other stators, whereby each stator and its associated set of windings, together with the rotor, form a single generator module, wherein a plurality of generator modules are formed from the plurality of stators, the set of windings on each stator, and the rotor; and a controller coupled to each generator module of the plurality of generator modules, wherein the controller is configured to: selectively connect to and draw electrical energy from one or more of the generator modules based on an output voltage of the energy harvester, sense vibration and wobble of the motor shaft based on an electrical waveform output by one or more of the generator modules, and maintain the output voltage over a range of harvester shaft rotational speeds based on the selective drawing of electrical energy from the one or more of the generator modules.

10. The machine of claim 9, wherein the N-pole permanent magnet is radially magnetized; wherein the rotor and stators are configured to be aligned with each other by measuring modulation at about 1 revolution per minute.

11. The machine of claim 9, wherein:
the N-pole permanent magnet comprises N-number of radially magnetized permanent magnet segments;
each permanent magnet segment coupled between two other permanent magnet segments;
each permanent magnet segment has its poles disposed opposite to those of the two other permanent magnet segments between which it is disposed; and
wherein each stator comprises a first stator half and a second stator half, wherein faces of the two stator halves that come together during assembly are polished so there is a minimal air gap between them.

12. The machine of claim 9, wherein:
the harvester shaft is non-magnetic; and
the energy harvester further comprises a magnetic flux return disposed between the rotor and the harvester shaft.

13. The machine of claim 9, wherein the housing includes an inner surface and comprises a plurality of non-magnetic spacers, each spacer extending radially inwardly from the inner surface and disposed between two of the stators.

14. The machine of claim 13, further comprising a fastener extending through each of the stators and each of the spacers and securing the stators within the housing.

15. The machine of claim 9, wherein the controller is further configured to disconnect each generator module not having electrical energy being drawn therefrom.

16. The machine of claim 9, wherein the controller is further configured to selectively draw electrical energy from a predetermined number of the generator modules when harvester shaft rotational speed exceeds a predetermined value.

17. The machine of claim 9, wherein each generator module is configured to generate 267 volts and 3.18 watts of electrical power at 1000 revolutions per minute.

18. The machine of claim 15, wherein the controller is further configured to selectively draw electrical energy from one or more of the generator modules to produce a predetermined power level.

19. The energy harvester of claim 1, wherein the controller is further configured to: disconnect each generator module not having electrical energy being drawn therefrom.

20. The energy harvester of claim 1, further comprising one or more voltage sensors, wherein the one or more voltage sensors are configured to sense an output voltage of the one or more generator modules, and send a signal indicative of the output voltage to the controller, wherein the controller is further configured to select a number of generator modules of the plurality of generator modules to selectively draw electrical energy from based on the signal indicative of the output voltage.

* * * * *